US009709239B2

(12) United States Patent
Weekamp et al.

(10) Patent No.: US 9,709,239 B2
(45) Date of Patent: Jul. 18, 2017

(54) LIGHTING DEVICE

(71) Applicant: PHILIPS LIGHTING HOLDING B.V., Eindhoven (NL)

(72) Inventors: Johannes Wilhelmus Weekamp, Beek en Donk (NL); Giovanni Cennini, Eindhoven (NL); Sébastien Paul René Libon, Tervuren (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/779,433

(22) PCT Filed: Mar. 17, 2014

(86) PCT No.: PCT/IB2014/059885
§ 371 (c)(1),
(2) Date: Sep. 23, 2015

(87) PCT Pub. No.: WO2014/155233
PCT Pub. Date: Oct. 2, 2014

(65) Prior Publication Data

US 2016/0053963 A1 Feb. 25, 2016

(30) Foreign Application Priority Data

Mar. 26, 2013 (EP) .................................... 13160982

(51) Int. Cl.

| | |
|---|---|
| ***B60Q 1/14*** | (2006.01) |
| ***F21V 1/14*** | (2006.01) |
| ***F21V 7/18*** | (2006.01) |
| ***F21V 17/00*** | (2006.01) |
| ***F21V 7/00*** | (2006.01) |

(Continued)

(52) U.S. Cl.
CPC ............ *F21V 1/146* (2013.01); *F21V 7/0008* (2013.01); *F21V 7/18* (2013.01); *F21V 17/007* (2013.01); *F21V 1/22* (2013.01); *F21V 13/08* (2013.01); *F21V 19/003* (2013.01);
(Continued)

(58) Field of Classification Search
CPC ... F21V 1/14; F21V 7/18; F21V 17/00; F21V 19/00; F21Y 2101/02; F21Y 2105/00
USPC ........... 362/278, 277, 285, 296.01, 306–308, 362/296.05
See application file for complete search history.

(56) References Cited

U.S. PATENT DOCUMENTS 3,418,651 A * 12/1968 Jacobson ................ F21L 11/00 340/321
3,796,869 A * 3/1974 Stone ........................ F21L 4/00 362/189

(Continued)

FOREIGN PATENT DOCUMENTS

AU 200810189 A4 3/2009
IL WO 2009147657 A2 * 12/2009 ................ F21V 1/06

(Continued)

*Primary Examiner* — Bryon T Gyllstrom

(57) ABSTRACT

A lighting device comprising a support panel located between two outer sheets, which support panel is provided with at least one light emitting module, while at least one of the outer sheets is translucent. The outer sheets are movable with respect to each other at least from a folded state in which the support panel and the outer sheets extend substantially parallel to each other and an unfolded state in which the outer sheets are at least partly further spaced apart than in the folded state.

15 Claims, 4 Drawing Sheets

(51) Int. Cl.

| | |
|---|---|
| *F21V 1/22* | (2006.01) |
| *F21V 13/08* | (2006.01) |
| *F21V 19/00* | (2006.01) |
| *F21Y 101/00* | (2016.01) |
| *F21Y 105/10* | (2016.01) |
| *F21Y 115/10* | (2016.01) |

(52) U.S. Cl.
CPC ....... *F21Y 2101/00* (2013.01); *F21Y 2105/10* (2016.08); *F21Y 2115/10* (2016.08)

(56) References Cited

U.S. PATENT DOCUMENTS

| | | | | |
|---|---|---|---|---|
| 5,483,431 | A * | 1/1996 | Ziliani | F21V 1/06<br>362/382 |
| 8,227,962 | B1 * | 7/2012 | Su | F21K 9/135<br>313/46 |
| 9,057,493 | B2 * | 6/2015 | Simon | F21K 9/17 |
| 2005/0281017 | A1 * | 12/2005 | Regester | G03B 15/02<br>362/16 |
| 2012/0155065 | A1 * | 6/2012 | Ubaghs | F21V 33/0008<br>362/103 |
| 2012/0320606 | A1 * | 12/2012 | Vossoughi | F21V 1/00<br>362/351 |

FOREIGN PATENT DOCUMENTS

| | | | | |
|---|---|---|---|---|
| NL | 1027289 C2 | | 4/2006 | |
| NL | WO 2013002131 A2 | * | 2/2013 | F21V 33/006 |

* cited by examiner

LIGHTING DEVICE

CROSS-REFERENCE TO PRIOR APPLICATIONS

This application is the U.S. National Phase application under 35 U.S.C. §371 of International Application No. PCT/IB14/059885, filed on Mar. 17, 2014, which claims the benefit of European Patent Application No. 13160982.8, filed on Mar. 26, 2013. These applications are hereby incorporated by reference herein.

FIELD OF THE INVENTION

The invention relates to a lighting device comprising a support panel located between two outer sheets, which support panel is provided with at least one light emitting module, whilst at least one of the outer sheets is translucent, which outer sheets are movable with respect to each other at least from a folded state in which the support panel and the outer sheets extend substantially parallel to each other and an unfolded state in which the outer sheets are at least partly further spaced apart than in the folded state.

BACKGROUND OF THE INVENTION

Foldable lighting devices are in very widespread use in a multitude of fields.

WO2009/147657A2 shows a foldable lampshade adaptable for inexpensive mass production and configured for easy assembly. The frame part comprises a pair of interconnected or separate complementary sheet-like parts, substantially shaped as a mirror image of each other. The sheet-like part is a sheet or foil, optionally having concave and/or convex relief shapes and/or notched curves as ornaments or folding aids. The lamp shade may be assembled and disassembled without removing the lamp socket with the lamp bulb.

It is a disadvantage of this lighting device that the size of the lighting device in the folded state (=position) in directions parallel to the sheet-like parts is relatively large. Furthermore, in the folded state, the lamp bulb is exposed and can easily get damaged or polluted.

SUMMARY OF THE INVENTION

In view of the above-mentioned and other drawbacks of the prior art, a general object of the present invention is to provide an improved foldable lighting device, in particular a lighting device that is easy to assemble.

According to a first aspect, the invention provides a lighting device wherein in the folded state the two parallel longitudinal sides of a first of the two outer sheets are connected to the respective two parallel longitudinal sides of a second of the two outer sheets to form a first and second set of interconnected longitudinal sides, wherein the first and second sets of interconnected longitudinal sides are movable towards each other to space apart the outer sheets in the unfolded state.

For moving the lighting device from a folded to an unfolded state, the first and second set of interconnected longitudinal sides are moved towards each other. During this movement the two outer sheets will curve outwardly allowing them to become at least partly spaced apart from the support panel. The result of the movement and curvature is a lighting device having a tube-like shape. In the folded state the lighting device is relative flat and therefore takes up very little space and is easy to store and to transport. Since the support panel is located between the outer sheets, both in the folded and unfolded state, the light emitting modules on the support panel are always protected against damages and pollution by the outer sheets.

In the folded state the outer sheets can have a width that is larger than the width of the support panel. In the unfolded state the distance between the longitudinal sides of the outer sheets is smaller than in the folded state. This allows the outer sheets to get curved.

According to a further aspect, the invention provides a lighting device wherein at least in the unfolded state, the two sets of interconnected longitudinal sides of the outer sheets comprise a mount for the support panel.

In the unfolded state the outer sheets can be curved in such a way that the connected parallel longitudinal sides of the outer sheets are at a distance with regard to each other that is approximately the same as the width of the support panel. The curved outer sheets are mounted under an angle with respect to each other in the region of the connected parallel longitudinal sides. The support panel can then be held by the respective angles formed by the two outer sheets on both parallel longitudinal sides. The support panel is in the unfolded state stuck between the connected parallel longitudinal sides. In the ideal situation there will be no play between the support panel and the connected parallel longitudinal sides, so that the support panel is firmly held in place and is unable to move in directions parallel to the support panel.

The support panel can be fastened to either one of the outer sheets by means of fastening means to prevent the support panel from moving in the longitudinal direction. In case that the support panel is fastened to both outer sheets, the constructional integrity of the lighting device is guaranteed, as in the unfolded state the fastened support sheet prevents the curved outer sheets from returning to their folded state.

Alternatively the interconnected parallel longitudinal sides can comprise protrusions, i.e. folded edges, that form a mount for the support panel.

According to a further aspect, the invention provides a lighting device wherein at least one of the outer sheets comprises a flap being foldable about a fold line that extends between the two parallel longitudinal sides.

The flap is foldable between a folded flat state and an unfolded state in which the flap is folded through a certain angle over the fold line, thus at least partly covering the transverse side of the lighting device.

According to a further aspect, the invention provides a lighting device wherein the fold line is arc-shaped, the convex side of the arc-shaped fold line being located outside the flap.

The arc-shaped fold line is advantageous since the outer sheets have a curved shape in the unfolded state. When the flap is folded about the arc-shaped fold line, the fold line will define the curvature of the outer sheet to which it is attached.

According to a further aspect, the invention provides a lighting device wherein the flap is delimited by the arc-shaped fold line on one side of the flap and an arc-shaped edge on the opposite side of the flap.

When the outer sheets are curved, an opening on the transverse side of the lighting device will have a cross section that is curved on both outer sheet sides. The flap will be able to cover the entire opening.

The flap is preferably folded through approximately 90 degrees and extends therefore substantially perpendicularly to the support panel. The flap is curved in such a way that the arc-shaped edge of the flap of one outer sheet is adjacent to the curved edge of the other outer sheet.

According to a further aspect, the invention provides a lighting device wherein in the unfolded state the outer sheets are held spaced apart by the folded flap.

In order for the outer sheets to remain in a curved state, the folded flap provides a blocking means preventing the outer sheets to return to the folded state. To this end the arc-shaped edge of the flap of one outer sheet is adjacent to the curved edge of the other outer sheet.

Preferably both outer sheets are provided with flaps on both sides, wherein the flaps near one side of the two outer sheets extend parallel to each other, wherein the arc-shaped fold line of one outer sheet is located near the arc-shaped edge of the other outer sheet.

According to a further aspect, the invention provides a lighting device wherein one of the outer sheets is reflective, whilst in the unfolded state light emitted by the light emitting module towards the reflective outer sheet is reflected by the reflective outer sheet towards the translucent outer sheet through the support panel.

The light emitting module can be any form of light emitting module, such as a conventional light bulb, a neon light or the like, but is preferably a light emitting diode (LED), that produces light having a very high intensity and that has a relative low power consumption compared to other light emitting modules. The light emitting modules are preferably mounted only on the side of the support panel facing the reflective outer sheet.

The reflective outer sheet has reflective properties in the direction facing the at least one light emitting module. Preferably the reflective outer sheet is highly reflective to reflect light to a maximum extent. The reflective outer sheet can for example be a MCPET sheet or an aluminium sheet.

The translucent outer sheet is a sheet that allows the light to pass from the inside of the lighting device to the outside of the lighting device. The translucent outer sheet is mounted on the side of the support panel facing away from the at least one light emitting module. The translucent outer sheet can be a plastic sheet.

The support panel comprises the at least one light emitting module and can comprise also the electric power supply lines that are needed to supply the at least one light emitting module with electric power.

More than one light emitting modules can be mounted on the support panel. To this end an array of interconnected light emitting modules can be formed.

A light ray that is emitted by the at least one light emitting module will travel towards the reflective outer sheet. The reflective outer sheet will reflect the light ray through the support panel, in the direction of the translucent outer sheet and through the translucent outer sheet towards the outside of the lighting device.

A curved reflective outer sheet allows the light to be reflected in different directions as the angles of incoming and outgoing light rays vary at each point of the curved reflective outer sheet. A curved translucent outer sheet provides the necessary space with the support panel to prevent spotty shadows on the translucent outer sheet.

When, for example, LEDs are used, the distance between the LEDs on the support panel is preferably less than the distance between the LED's and the translucent outer sheet to obtain a uniform light distribution over the translucent outer sheet. Since the light is first directed towards the reflective outer sheet and then back through the support panel towards the translucent outer sheet, the distance between the two outer sheets can be about ⅔ of the distance which would be needed if the light were directed directly from the support panel to the translucent outer sheet to obtain the same length of a light path.

According to a further aspect, the invention provides a lighting device wherein the support panel is at least partly translucent.

Preferably, the support panel has an open structure, allowing light to pass through the support panel. The light that is reflected by the reflective outer sheet will pass through the support panel on which the light emitting modules and the electric power supply lines are mounted.

In order to minimize the amount of light that is blocked by the light emitting modules, the support panel itself and eventually the electric power supply lines, the support panel can comprise translucent parts, such as for example a base panel made out of a transparent plastic. Alternatively the support panel can be formed as a wire grid onto which light emitting modules are mounted. The areas that are not covered with wires or light emitting modules can be open areas. No base panel has to be provided in those areas as the constructional strength of the support panel can be provided by the wire grid.

According to a further aspect, the invention provides a lighting device wherein the translucent outer sheet is a light diffuser.

The light diffuser can be a translucent plastic sheet having a certain surface roughness. The surface roughness breaks up a light ray that passes through the light diffuser and disperses the light in multiple directions. The use of a diffuser has the advantage that light of a relatively high intensity is spread out in multiple directions, thus reducing the relative intensity of the light in one specific direction. Glare, that is caused by high intensity light rays in a specific direction, is thus further reduced to a large extent.

When a light ray emitted by the light emitting module is reflected by the reflective outer sheet in the direction of the support panel, the light ray may hit the light emitting module and thus cause a shadow on the translucent outer sheet. The diffuser serving as a translucent outer sheet will disperse the light and provide an even distribution of light to the user and thus make up for the shadow. To this end the diffuser needs to be spaced apart from the support panel.

The diffuser sheet is preferably a PET or PC film having a surface roughness.

According to a further aspect, the invention provides a lighting device wherein the reflective outer sheet is opaque.

An opaque reflective outer sheet prevents light from passing through the reflective outer sheet. As the reflective outer sheet reflects all the light that hits the reflective sheet, the loss of light is minimized and the light output through the translucent outer sheet is maximized.

According to a further aspect, the invention provides a lighting device wherein, the interconnected longitudinal sides of the outer sheets are connected to each other by fastening means.

The fastening means can comprise for example clips, rings or adhesive tape. The fastening means allow tilting of a region near the longitudinal side of one of the outer sheet with respect to a region near the longitudinal side of the other outer sheet to unfold the lighting device.

BRIEF DESCRIPTION OF THE DRAWINGS

These and other aspects of the invention will now be described in more detail, with reference to the appended drawings showing currently preferred embodiments of the inventions, wherein.

DESCRIPTION OF PREFERRED EMBODIMENTS

Figure 1A:
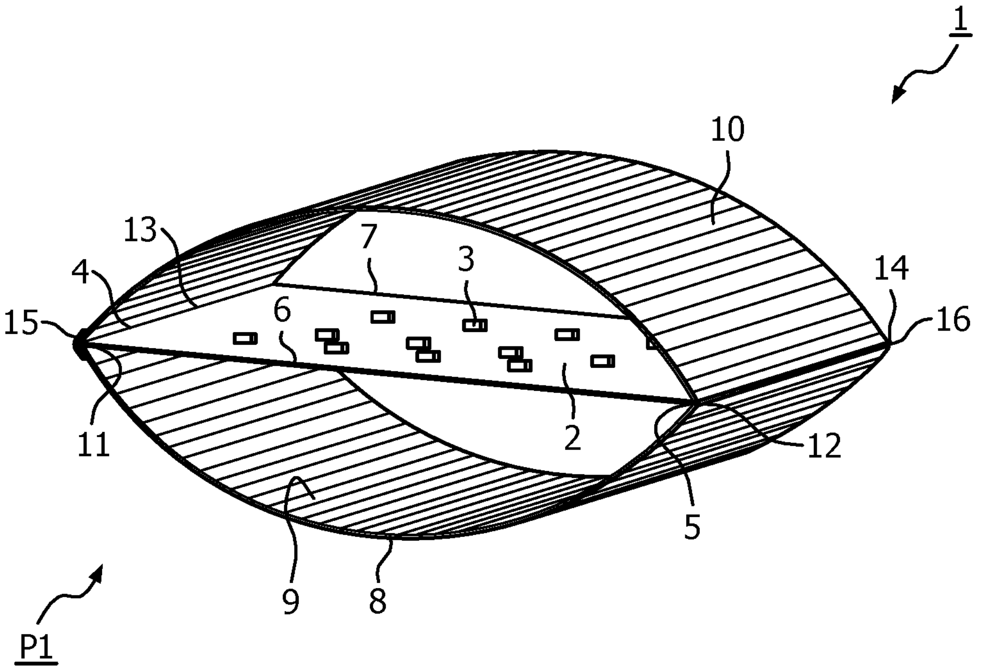
FIGS. 1A and 1B show a perspective view and a cross section, respectively of a first embodiment of the lighting device according to the invention in the unfolded state.

FIGS. 1A-3B show perspective and cross sectional views of a first embodiment of the lighting device 1 according to the invention. The lighting device 1 comprises a support panel 2 on which light emitting modules 3, for example LEDs, are mounted on one side of the support panel 2. The support panel 2 has two opposite longitudinal sides 4, 5 and two opposite transverse sides 6, 7. The longitudinal sides 4, 5 extend in the direction of the arrow P1.

On the side of the support panel 2 on which the light emitting modules 3 are mounted, the lighting device 1 comprises a reflective outer sheet 8. The reflective outer sheet 8 is provided with a reflective layer 9. The reflective layer 9 is directed towards the light emitting modules 3. The reflective outer sheet 8 has a first and a second parallel longitudinal side 11, 12 which extends in the direction of the arrow P1. Preferably the reflective outer sheet 8 is opaque thus preventing light from being emitted from this side of the lighting device 1.

On the other side of the support panel 2 the lighting device 1 comprises a translucent outer sheet 10. The translucent outer sheet 10 has a first and a second parallel longitudinal side 13, 14 which extends in the direction of the arrow P1.

The first longitudinal side 11 of the reflective outer sheet 8 is connected to the first longitudinal side 13 of the translucent outer sheet 10 by means of a fastening means in the form of an adhesive tape 15. On the opposite side of both curved outer sheets, the second longitudinal side 12 of the reflective outer sheet 8 is connected to the second longitudinal side 14 of the translucent outer sheet 10 by means of a fastening means in the form of an adhesive tape 16.

Figure 1B:
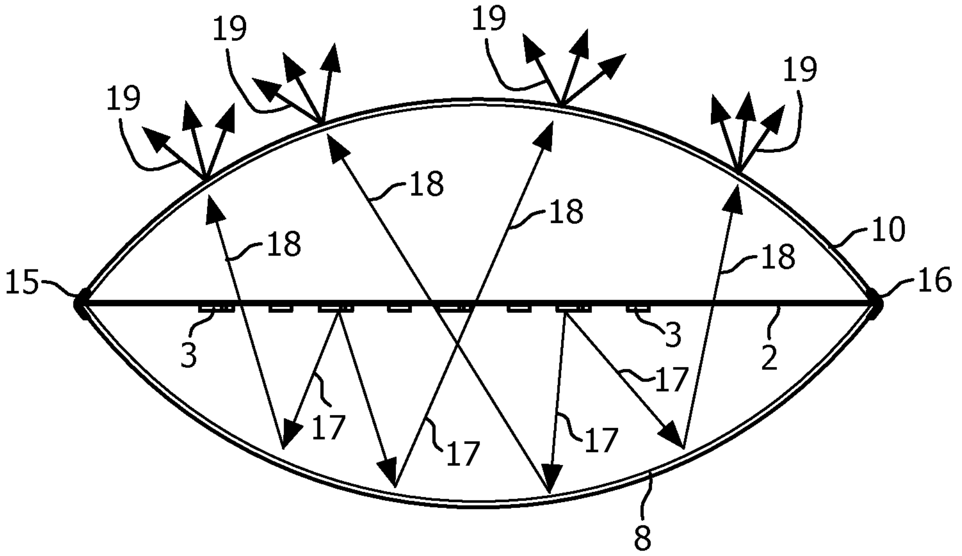
Figure 2A:
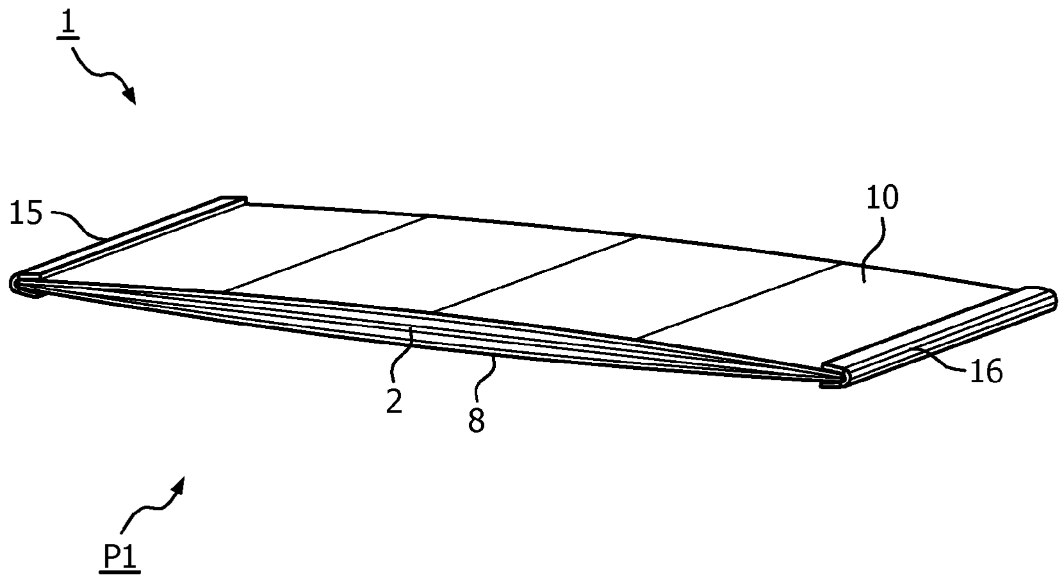
FIGS. 2A and 2B show a perspective view and a cross section, respectively of the embodiment as shown in the FIGS. 1A and 1B in the folded state.
Figure 2B:
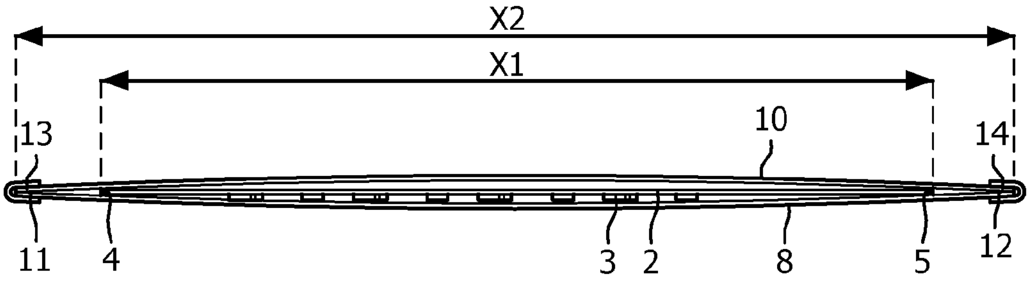
Figure 3A:
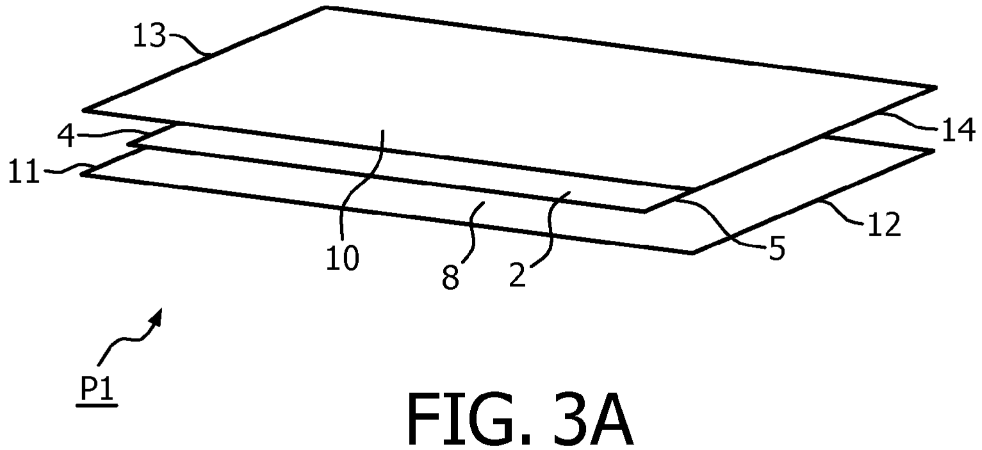
FIGS. 3A and 3B show a perspective view and a cross section, respectively of a stack of layers of the lighting device as shown in FIGS. 2A and 2B in the folded state.
Figure 3B:
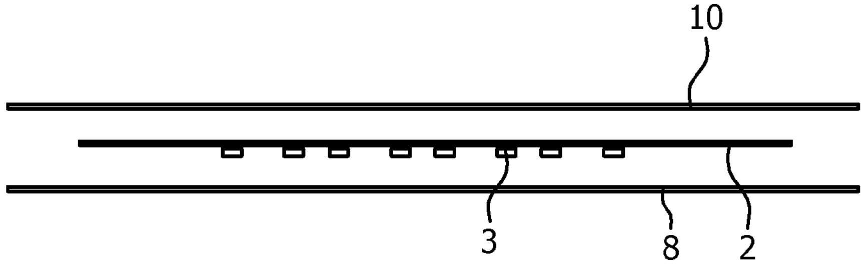

In the unfolded state as shown in FIGS. 1A and 1B, the outer sheets 8, 10 are spaced apart from each other and spaced apart from the support panel 2 between the interconnected first longitudinal sides 11, 13 and the interconnected second longitudinal sides 12, 14, thus forming a hollow, tube-like member that forms a housing of the lighting device 1.

In the unfolded state, the reflective outer sheet 8 and the translucent outer sheet 10 are curved in such a way that the interconnected first longitudinal sides 11, 13 and the interconnected second longitudinal sides 12, 14 are in contact with the longitudinal sides 4, 5 respectively of the support panel 2.

FIG. 1B shows the lighting device 1 in the unfolded state when in use. Light rays 17 are emitted by the light emitting module 3 towards the reflective outer sheet 8. These light rays 17 are reflected by the reflective outer sheet 8 as light rays 18 which pass through the at least partly translucent support panel 2 in the direction of the translucent outer sheet 10. The translucent outer sheet 10 acts as a diffuser. The light rays 18 that arrive at the translucent outer sheet 10 pass through the translucent outer sheet 10 as a multitude of light rays 19 propagates in a multitude of directions.

The diffusion of the light rays 18 reduces the intensity of the light. The light rays 19 that pass through the translucent outer sheet have an intensity that is far less than the intensity of the light rays 18. Glare, which is caused as a result of high intensity light rays, is therefore reduced to a large extent.

In the folded state, the support panel 2, the reflective outer sheet 8 and the translucent outer sheet 10 are all flat, as shown in FIGS. 2A-3B. The distance X1 between the longitudinal sides 4, 5 of the support panel 2 is smaller than the distance X2 between the longitudinal sides 11, 12 of the first outer sheet 8 and smaller than the same distance X2 between the longitudinal sides 13, 14 of the second outer sheet 10.

In the folded state the reflective outer sheet 8 is adjacent to the light emitting modules, thus forming a protective layer for the light emitting modules 3, for example during storage and transport.

When assembling the lighting device 1 from the folded into the unfolded state, a user can push the interconnected first longitudinal sides 11, 12 and second longitudinal sides 13, 14 towards each other, thus reducing the distance between the interconnected longitudinal sides 11, 12 and 13, 14 with respect to each other. The distance between the interconnected first and second longitudinal sides 11, 12 and 13, 14 is reduced from distance X2 to distance X1. As the support panel 2 also has a distance X1 between the longitudinal sides 4, 5, the reduction of the distance X2 to X1 allows the support panel 2 to be held at the longitudinal sides 11, 12 and 13, 14 of the outer sheets.

When reducing the distance X2 to the distance X1, the reflective outer sheets 8 and the translucent outer sheet 10 are being curved in such a way that both outer sheets become spaced apart from each other and also become spaced apart from the support panel 2. To allow the curvature of reflective outer sheet 8 and translucent outer sheet 10, both outer sheets 8, 10 are made from a flexible material.

In the region of the adhesive tape 15, 16, the reflective outer sheet 8 and the translucent outer sheet 10 are adjacent to each other and tilted with respect to each other. The angle that is defined between the reflective outer sheet 8 and the translucent outer sheet 10 forms the space in which the support panel 2 is held. The support panel 2 can be tightly fitted between the longitudinal sides 11, 12 and 13, 14, thus being firmly mounted without any play in the transverse direction. The lighting device 1 can be maintained in the unfolded state by several means, for example by attaching the longitudinal sides 4, 5 of the support panel 2 to the interconnected longitudinal sides 11, 12 respectively.

The distance between adjacent light emitting modules 3 on the support panel 2 near the longitudinal sides 11, 12, 13, 14 is preferably smaller than the distance between adjacent light emitting modules 3 located near the center of the support panel 2, so that over the whole lighting device the total length of a light path from the light emitting modules 3 on the support panel 2 towards the reflective outer sheet 8 and then back through the support panel 2 towards the translucent outer sheet 10 is slightly larger than the distance between adjacent light emitting modules 3 on the support panel 2.

Figure 4A:
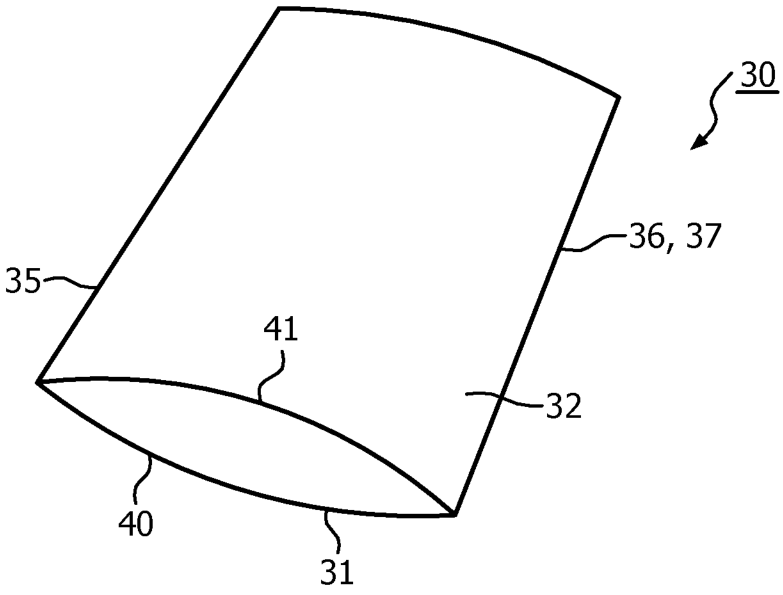
FIG. 4A shows a perspective view of a second embodiment of the lighting device according to the invention in the unfolded state.
Figure 4B:
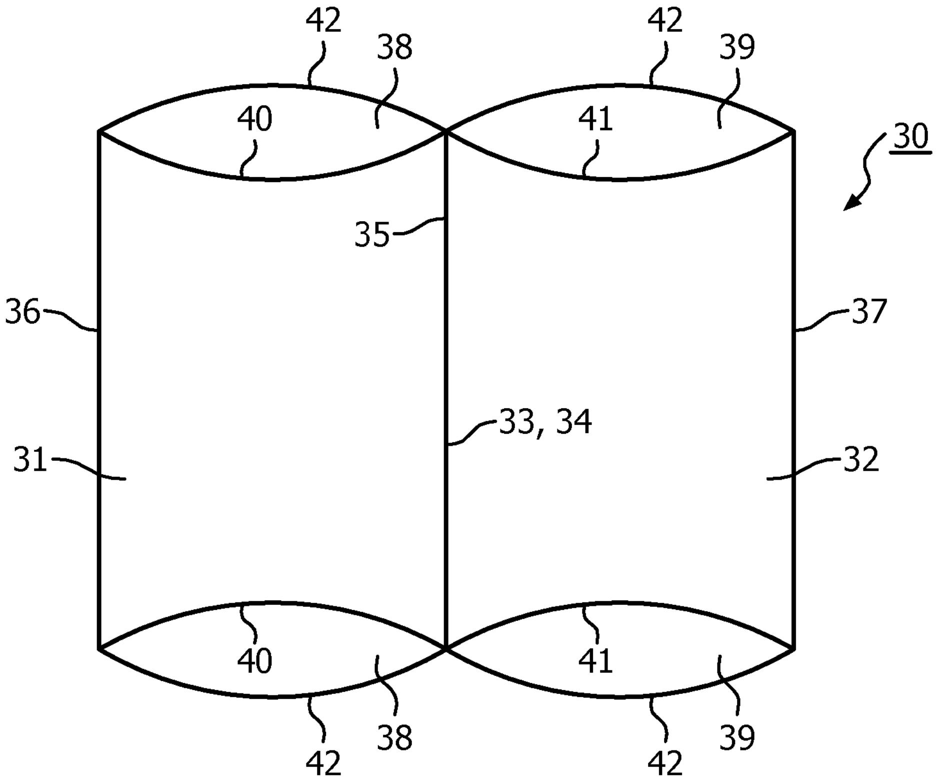
FIG. 4B shows a plano of the outer sheets and the flaps of the lighting device as shown in FIG. 4A in a folded state.

FIGS. 4A-4B show a lighting device 30 according to the invention in the unfolded state (FIG. 4A) and in the folded state (FIG. 4B).

The lighting device 30 comprises a support panel with light emitting modules (not shown), a reflective outer sheet 31 and a translucent sheet 32. In the folded state, as shown in FIG. 4B, the reflective outer sheet 31 and the translucent sheet 32 are connected to each other at longitudinal sides 33, 34 which form a fold line 35. Longitudinal sides 36, 37 of the outer sheet 31, 32 are located on both sides of the fold line 35. In the folded state both outer sheets 33, 34 are located in the same place.

On the transverse sides of the reflective outer sheet 31 and the translucent outer sheet 32 flaps are formed. The flaps 38, 39 are connected to the respective outer sheets 31, 32 via arc-shaped fold lines 40, 41. The arc-shaped fold lines 40 extend between the longitudinal sides 33, 36 of the reflective outer sheet 31. The fold lines 41 extend between the longitudinal sides 34, 37 of the translucent outer sheet 32. The arc-shaped fold lined 40, 41 are such that the convex side of the arc-shaped fold lines 40, 41 is located outside the flap 38, 39 and on the outer sheets 31, 32. The outer edge side 42 of the flaps 38, 39 that delimits the flaps 38, 39 on the side opposite to the arc-shaped fold lines 40, 41 has preferably the same arc-shaped form as the arc-shaped fold lines 40, 41. The concave side of the arc-shaped edge side 42 is directed towards the flap 38, 39.

When assembling the lighting device 30 from the folded to the unfolded state, the reflective outer sheet 31 and the translucent outer sheet 32 are folded about the fold line 35 in such a way that the longitudinal side 36 of the reflective outer sheet 31 and the longitudinal side 37 of the translucent outer sheet 32 become adjacent to each other. Both longitudinal sides 36, 37 are connected to each other by means of fastening means like tape. The interconnected longitudinal sides 33, 34 and the interconnected longitudinal sides 36, 37 are then moved towards each other, thus causing the outer sheets 31, 32 to curve into an arc-shaped form and to become at least partly spaced apart from each other. The outer sheets 31, 32 form a hollow, tube-like member. Subsequently, the flaps 38, 39 are folded about the arc-shaped fold lines 40, 41 through an angle of approximately 90 degrees, in order to cover an opening on the transverse side of the tube-like member.

First, the flap 38 is folded about the fold line 40 until its edge side 42 is adjacent to the fold line 41 of the flap 39. Then the flap 39 is folded about the fold line 41 until its edge side 42 is adjacent to the fold line 40 of the flap 38. The folded flaps 38, 39 allow the lighting device 30 to be kept in the unfolded state as to preserve its constructive integrity. The flaps 38, 39 prevent the outer sheets 31, 32 to return to the folded, flat state and ensure that the reflective outer sheet 31 and the translucent outer sheet 32 remain spaced apart.

Alternatively also other means can be used to keep the reflective outer sheet 31 and the translucent outer sheet 32 spaced apart in the unfolded state. To this end, spacers, rods or flaps of any other form can be used that are mounted in the transverse opening between the reflective outer sheet 31 and the translucent outer sheet 32.

The support panel 2 can be a wire grid or a stretched lead frame onto which light emitting modules are mounted.

The fastening means to interconnect the reflective outer sheet and the translucent outer sheet are not limited to adhesive tape. Other possible fastening means can be, for example, a glue, rings, buttons or a sewn thread.

Alternatively the support panel 2 can be held between the outer sheets by other mounting means. To this end the longitudinal sides of the support panel 2 can be provided with protrusions, such as pins, that protrude at least from one of the outer sheets while holding the support panel in place. The other mounting means can also comprise folded cutouts in the outer sheets that allow mounting of the support panel.

It is also possible that both outer sheets are translucent.

It is further noted that a lighting device can be provided wherein light emitting modules are mounted on both sides of the support panel each facing one of the translucent outer sheets.

Such a light emitting module on the side of the support panel facing the translucent outer sheet allows light of relatively high intensity to be distributed through the translucent outer sheet and towards the exterior.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the scope should not be construed as limiting the scope of the claims.

LIST OF REFERENCE SIGNS

1 lighting device
2 support panel
3 light emitting module
4 side
5 side
6 side
7 side
8 outer sheet
9 layer
10 outer sheet
11 side
12 side
13 side
14 side
15 tape
16 tape
17 light rays
18 light rays
19 light rays
30 lighting device
31 outer sheet
32 outer sheet
33 side
34 side
35 fold line
36 side
37 side
38 flap
39 flap
40 fold line
41 fold line
42 edge side
P1 arrow
X1 distance
X2 distance
X3 distance

The invention claimed is:

1. A lighting device comprising;

a support panel located between two outer sheets, each of the outer sheets having two parallel longitudinal sides, the outer sheets being movable with respect to each other between a folded state and an unfolded state;

wherein, in the folded state, the outer sheets are flat and extend substantially parallel to the support panel, wherein, in the unfolded state, the outer sheets are curved and at least partly further spaced apart than in the folded state, wherein the two parallel longitudinal sides of a first one of the two outer sheets are connected to the respective two parallel longitudinal sides of a second one of the two outer sheets to form first and second sets of interconnected longitudinal sides, wherein the first and second sets of interconnected longitudinal sides are movable towards each other to push the outer sheets spatially apart from each other in the unfolded state, and wherein the support panel comprises at least a light emitting diode as a light emitting module and is located between the outer sheets in the folded state and the unfolded state, said light emitting diode facing at least one of the outer sheets.

2. The lighting device according to claim 1, wherein at least in the unfolded state, the two sets of interconnected longitudinal sides of the outer sheets comprise a mount for the support panel.

3. The lighting device according to claim 1, wherein at least one of the outer sheets comprises a flap being foldable around a fold line that extends between the two parallel longitudinal sides.

4. The lighting device according to claim 3, wherein the fold line is arc-shaped, the convex side of the arc-shaped folding line is located outside the flap.

5. The lighting device according to claim 4, wherein the flap is delimited by the arc-shaped folding line on one side of the flap and an arc-shaped edge on the opposite side of the flap.

6. The lighting device according to claim 5, wherein in the unfolded state the outer sheets are kept spaced apart by the folded flap.

7. The lighting device according to claim 6, wherein one of the outer sheets is reflective, whilst in the unfolded state light emitted by the light emitting module towards the reflective outer sheet is reflected by the reflective outer sheet towards the other translucent outer sheet through the support panel.

8. The lighting device according to claim 7, wherein the support panel is at least partly translucent.

9. The lighting device according to claim 7, wherein the translucent outer sheet is a light diffuser.

10. The lighting device according to claim 9, wherein the reflective outer sheet is opaque.

11. The lighting device according to claim 10, wherein the interconnected longitudinal sides of the outer sheets are connected to each other by fastening means.

12. The lighting device according to claim 11, wherein the light emitting diodes are mounted on both sides of the support panel, each facing a respective one of the outer sheets.

13. The lighting device according to claim 1, wherein both the outer sheets are translucent.

14. The lighting device of claim 1, wherein the support panel comprises a plurality of light emitting diodes.

15. The lighting device of claim 14, wherein a distance between neighboring light emitting diodes on the support panel proximate the longitudinal sides is less than a distance between neighboring light emitting diodes on the support panel near a center portion of the support panel.

* * * * *